United States Patent [19]
Grabarse et al.

[11] Patent Number: 5,951,736
[45] Date of Patent: Sep. 14, 1999

[54] COMBINATIONS OF ACTIVE INGREDIENTS FOR INHIBITING OR CONTROLLING NITRIFICATION

[75] Inventors: Margrit Grabarse, Seelingstädt; Sieghard Lang, Cunnersdorf; Hans-Jürgen Michel, Machern; Hartmut Wozniak, Cunnersdorf, all of Germany

[73] Assignee: SKW Stickstoffwerke Piesteritz GmbH, Lutherstadt Wittenberg, Germany

[21] Appl. No.: 08/693,141

[22] PCT Filed: Feb. 20, 1995

[86] PCT No.: PCT/DE95/00248

§ 371 Date: Aug. 13, 1996

§ 102(e) Date: Aug. 13, 1996

[87] PCT Pub. No.: WO95/22515

PCT Pub. Date: Aug. 24, 1995

[30] Foreign Application Priority Data

Feb. 21, 1994 [DE] Germany ............... 44 05 392

[51] Int. Cl.⁶ ............... C05C 3/00; C05C 11/00; C05C 13/00
[52] U.S. Cl. ................................. 71/27; 71/902
[58] Field of Search .................. 71/902, 1, 11, 71/27, 903, 904

[56] References Cited

U.S. PATENT DOCUMENTS 3,701,645  10/1972  Scott .

FOREIGN PATENT DOCUMENTS 227957  10/1985  German Dem. Rep. .

OTHER PUBLICATIONS

Database WPI Section Ch, Week 8534 Derwent Publications Ltd., London, GB; Class C04, AN 85–208634, (No date available).

Chemical Abstracts, vol. 112, No. 15, Apr. 9, 1990 Columbus Ohio, US; Abstract No. 138171u, Bremner et al.

International Publication WO93/21134 published Oct. 28, 1993.

*Primary Examiner*—Wayne Langel
*Attorney, Agent, or Firm*—Henry M. Feiereisen

[57] ABSTRACT

This patent describes nitrification inhibitors characterized by the fact that they contain as their active ingredients 1-hydro-1,2,4-triazole, a substituted 1-hydro-1,2,4-triazole, or their salts or metallic complexes, plus at least one other chemical compound, such as a substituted pyrazole, or its salts or metallic complexes, dicyanodiamide, guanyl thiocarbamide, thiocarbamide, ammonium rhodanide, or ammonium thiosulfate, where said combinations exhibit readily recognizable synergetic effects compared to the case where said chemical compounds are employed alone, and thus provide benefits in terms of better efficacies, reduced dosages, and/or cost savings.

3 Claims, No Drawings

COMBINATIONS OF ACTIVE INGREDIENTS FOR INHIBITING OR CONTROLLING NITRIFICATION

BACKGROUND OF THE INVENTION

The present invention concerns combinations of two or more active ingredients for inhibiting or controlling nitrification of ammonia in arable topsoil and subsoil.

Reduced nitrogen, such as that contained in ammonia, ammonium compounds, or nitramide, present in arable soil is rapidly transformed into nitrates via intermediate nitrite stages by bacterial action. The rates at which nitrification proceeds are largely determined by the temperatures, moisture contents, pH, and bacterial activities of the soils involved. A counteracting effect here is that, unlike the nitrogen of ammonia or ammonium compounds, that of nitrates will not be sorbed by the sorbing agents present in arable soil, and will thus either precipitate out and be washed away by surface runoff, or will end up being deposited in deep-lying strata extending down to the water table and below levels accessible to plants. Under adverse weather or soil conditions, runoff losses may exceed 20% of total available reduced nitrogen. To be added to these losses are denitrification losses due to reduction of nitrates formed by nitrification processes to gaseous compounds under anaerobic conditions, losses that may reach comparable levels.

Employing suitable chemicals to inhibit or control nitrification can promote utilization of nitrogen fertilizers by plants. Moreover, this approach provides further benefits in that it reduces nitrate concentrations in ground water and surface runoff, and counteracts nitrate enrichment in cultivated plants, particularly forage crops.

In addition to substituted pyrazoles (U.S. Pat. No. 3,494,757, DD 133088), other known solutions to these problems involve employing dicyanodiamide (DCD) (DE 2702284, DE 2714601), guanyl thiocarbamide (JP 7301138), thiocarbamide (DE 2051935), 1,2,4-triazole, 4-amino-1,2,4-triazole (JP 7104135), or other triazole derivatives (U.S. Pat. No. 3,697,244, U.S. Pat. No 3,701,645).

Combinations of active ingredients supposedly superior to the above-mentioned compounds when employed alone have also been recommended. Among those combinations worth noting here are admixtures of pyrazoles and DCD (DD 222471) or guanyl thiocarbamide (DD 247894), admixtures of 4-amino-1,2,4-triazole (ATC) and DCD (SU 1137096), and amalgams of, e.g., ATC in carbamide/thiocarbamide or carbamide/DCD-mixtures (DD 227957). Employing admixtures of dicyanodiamide and ammonium thiosulfate has also been recommended (DE 3714729).

The disadvantages of these known nitrification inhibitors are their low efficacies, which implies that large dosages will be required, volatilities or instabilities that are too high to allow them to be of much benefit in practical applications, or decomposition rates that are too rapid for the types of applications involved. Moreover, although some of these inhibitors retard nitrification to acceptable degrees, their efficacies are severely reduced by "incompatibility reactions" with several types of fertilizers.

SUMMARY OF THE INVENTION

The object of the present invention is identifying combinations of active ingredients suitable for employment in mineral and organic nitrogen fertilizers that will have synergetic effects on inhibition of nitrification, and will thus be more beneficial than either employing the compounds involved alone, or employing any of those combinations mentioned above.

Surprisingly, it has been found that when employed for inhibiting or controlling nitrification in arable topsoil and subsoil, combinations of active ingredients containing 1-hydro-1,2,4-triazole, a substituted 1-hydro-1,2,4-triazole, or their salts or metallic complexes, plus at least one other chemical compound, such as a substituted pyrazole, or its salts or coordination compounds, dicyanodiamide, guanyl thiocarbamide, thiocarbamide, ammonium rhodanide, or ammonium thiosulfate, exhibit marked synergetic effects, and are thus are more effective than any of these compounds when employed alone.

The ingredients of the combinations of the present invention may be admixed in proportions ranging from 0.5: 99.5 to 99.5: 0.5. Where combinations contain more than two ingredients, mixing ratios may be arbitrarily adjusted for each ingredient involved.

The combinations of the present invention are beneficial in the sense that they provide enhanced long-term effects, i.e., nitrification is inhibited over extended periods, and they thus contribute to providing that nitrogen released by nitrogen fertilizers will be better utilized, and that these fertilizers will therefore be more effective, even where lower dosages are employed. A related effect of employing such combinations is that cultivated plants have been observed to yield more biomass.

PREFERRED EMBODIMENTS OF THE INVENTION

The combinations of active ingredients of the present invention may be employed admixed with liquid or solid mineral or organic fertilizers containing nitramide or ammonium compounds, in which case they should be applied in dosages ranging from 0.5 kg/ha to 20 kg/ha.

The following examples will serve to clarify the present invention, but shall not be construed as imposing any restrictions on same. Table 1 lists a selection of those triazoles and their salts and metallic complexes employed as basic ingredients of those combinations studied, while Table 2 lists several of the other ingredients that were admixed with said triazoles.

TABLE 1

| Symbol | Designation/Chemical Formula |
| --- | --- |
| Tr | 1-hydro-1,2,4-triazole |
| Tr × HCl | 1-hydro-1,2,4-triazole × HCl |
| HMT | 1-hydroxy-methyl-1,2,4-triazole × HCl |
| Na—Tr | 1-sodium-1,2,4-triazolate |
| Fe—Tr | $[Fe(Tr)_6]Cl_3$ |
| GTr | 1-guanyl-1,2,4-triazole × HCl |
| CTS | $[Cu(Tr)_2]SO_4 \times 2H_2O$ |
| MT | $[Mn(Tr)_4]Cl_2$ |

TABLE 2

| Symbol | Designation/Chemical Formula |
| --- | --- |
| GTH | guanyl thiocarbamide |
| TH | thiocarbamide |
| AR | ammonium rhodanide |
| DCD | dicyanodiamide |
| ATS | ammonium thiosulfate |
| MP | 3-methylpyrazole |
| CMP | 1-carbamyl-3-methylpyrazole |

TABLE 2-continued

| Symbol | Designation/Chemical Formula |
|---|---|
| GMP | 1-guanyl-3-methylpyrazole × HCl |
| Mg—MP | Mg-3-methylpyrazolate |
| Zn—MP | [Zn(MP)$_2$]SO$_4$ |
| GZC | (GMPH)$_2$ZnCl$_4$ |
| GM | Mg(GMP)$_2$Cl$_2$ × H$_2$O |

The results of employing such combinations in the examples presented below were all obtained using the same methodology.

EXAMPLES

The combinations of the present invention, along with carbamide (urea), which served as a source of nitrogen, were admixed with a sandy loam similar to humus in the concentrations listed in the following tables (all concentrations stated in ppm are by weight, referred to the total weight of soil involved), brought up to 50% of their maximum moisture-retention capacities, and then vigorously mixed. The concentration of elemental nitrogen employed was 10 mg/100 g of soil. Soil samples prepared in this fashion were placed in plastic bottles, the bottles sealed, incubated at 20° C., and the resultant rates of nitrate formation and declines in ammonia concentrations monitored.

Percentage nitrification inhibitions were computed from the relation $$\text{percentage nitrification inhibition} = \frac{K-A}{K-B} \times 100,$$

where

K is the nitrate concentration in soil samples that were admixed with nitrogen fertilizer, but had no active ingredients added, A is the nitrate concentration in soil samples that were admixed with both nitrogen fertilizer and active ingredients, and B is the nitrate concentration in soil samples that were admixed with neither nitrogen fertilizer nor active ingredients.

Values of $t_{50}$, which are efficacy factors representing those time periods, expressed in days, that had elapsed until nitrification inhibitions had declined to 50% of their initial levels, were determined from nonlinear regressions applied to the temporal degradation data Values of $t_{50}$ obtained in this fashion were subjected to Logit-Probit transforms (which linearize effect-dosage curves) in order to assess the effects of the combinations involved based on the independence model of Groeger, et al, [Pharmazle 36 (1981), pp. 81–87], which incorporates a generalization of the theories of Gowing [Weeds 8 (1960), pp. 379–391] and of Colby [Weeds 15 (1967), pp. 20–22], according to which the effects of such combinations were regarded as synergetic if they were better than those of the ingredients involved when employed alone, or if the dosages required to yield given effect; were less than those predicted by the independence model.

Example 1

Combinations of 1-hydro-1,2,4-triazole (Tr) and dicyanodiamide (DCD)

Values of $t_{50}$ were computed and compared for cases where Tr alone, DCD alone, and admixtures of the two were employed, following the methodology referred to above.

TABLE 3a

Values of $t_{50}$ for Tr alone, DCD alone, and admixtures of the two.

| 1-Hydro-1,2,4-Triazole Concentration [ppm] | Dicyanodiamide Concentration [ppm] | Tr:DCD Mixing Ratio | $t_{50}$ [days] |
|---|---|---|---|
| 0.096 | | | 5.5 |
| 0.227 | | | 14.0 |
| 0.545 | | | 30.0 |
| 0.909 | | | 41.5 |
| 1.25 | | | 46.0 |
| 2.0 | | | 50.0 |
| 3.0 | | | 52.3 |
| 5.0 | | | 57.0 |
| | 1.25 | | 10.0 |
| | 2.0 | | 14.3 |
| | 3.0 | | 17.6 |
| | 3.846 | | 19.7 |
| | 5.0 | | 22.0 |
| | 5.882 | | 23.6 |
| | 8.333 | | 27.3 |
| | 9.091 | | 28.4 |
| | 10.0 | | 29.6 |
| 5.0 | 5.0 | 50:50 | 73.8 |
| 3.0 | 3.0 | | 58.2 |
| 2.0 | 2.0 | | 57.1 |
| 1.25 | 1.25 | | 52.5 |
| 1.667 | 8.333 | 17:83 | 106.6 |
| 1.0 | 5.0 | | 71.5 |
| 0.667 | 3.333 | | 53.7 |
| 0.417 | 2.083 | | 37.1 |
| 0.909 | 9.091 | 9:91 | 111.8 |
| 0.545 | 5.445 | | 69.4 |
| 0.364 | 3.636 | | 45.5 |
| 0.227 | 2.273 | | 28.7 |
| 0.25 | 3.75 | 6:94 | 37.3 |
| 0.156 | 2.344 | | 23.9 |
| 0.19 | 3.81 | 5:95 | 32.1 |
| 0.119 | 2.38 | | 22.2 |
| 0.385 | 9.615 | 4:96 | 73.5 |
| 0.231 | 5.769 | | 41.5 |
| 0.154 | 3.846 | | 29.6 |
| 0.096 | 2.404 | | 21.3 |
| 0.196 | 9.804 | 2:98 | 48.1 |
| 0.118 | 5.882 | | 31.2 |

TABLE 3b

Percentage savings of active ingredients and incremental improvements in efficacies, relative to those predicted by the independence model (IM).

| Tr:DCD Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 10 | 74 | 82 | -8 | -53 |
| | 6 | 58 | 72 | -14 | -68 |
| | 4 | 57 | 61 | -4 | -17 |
| | 2.5 | 52 | 48 | 4 | 14 |
| 17:83 | 10 | 100 | 64 | 36 | — |
| | 6 | 71 | 50 | 21 | 55 |
| | 4 | 54 | 39 | 14 | 42 |
| | 2.5 | 37 | 29 | 8 | 31 |
| 9:91 | 10 | 100 | 53 | 47 | — |
| | 6 | 69 | 40 | 29 | 69 |
| | 4 | 45 | 31 | 14 | 47 |
| | 2.5 | 29 | 23 | 6 | 29 |
| 6:94 | 4 | 47 | 37 | 10 | 36 |
| | 2.5 | 30 | 28 | 2 | 12 |
| 5:95 | 4 | 40 | 34 | 6 | 25 |
| | 2.5 | 28 | 26 | 2 | 11 |
| 4:96 | 10 | 92 | 52 | 40 | — |
| | 6 | 52 | 61 | 9 | 40 |

TABLE 3b-continued

Percentage savings of active ingredients and incremental improvements in efficacies, relative to those predicted by the independence model (IM).

| Tr:DCD Mixing Ratio | Concentration in Host Soil [ppm] | Empirically Determined Efficacy | Efficacy Predicted by the IM | Efficacy Increment | Dosage Savings [%] |
|---|---|---|---|---|---|
|  | 4 | 37 | 33 | 4 | 21 |
|  | 2.5 | 27 | 25 | 2 | 11 |
| 2:98 | 10 | 60 | 46 | 14 | 48 |
|  | 6 | 39 | 36 | 3 | 17 |

Example 2

Combinations of 1-hydro-1,2,4-triazole (Tr) and guanyl thiocarbamide (GTH)

The experimental methodology and computerized data analyses employed here were similar to those employed in the case of Example 1, above.

TABLE 4a

Values of $t_{50}$ for Tr alone, GTH alone, and admixtures of the two.

| 1-Hydro-1,2,4-Triazole Concentration [ppm] | Guanyl Thiocarbamide Concentration [ppm] | Tr:GTH Mixing Ratio | $t_{50}$ [days] |
|---|---|---|---|
| 0.096 |  |  | 5.5 |
| 0.227 |  |  | 14.0 |
| 0.545 |  |  | 30.0 |
| 0.909 |  |  | 41.5 |
| 1.25 |  |  | 46.0 |
| 2.0 |  |  | 50.0 |
| 3.0 |  |  | 52.3 |
| 5.0 |  |  | 57.0 |
|  | 2.0 |  | 1.0 |
|  | 4.0 |  | 9.3 |
|  | 6.0 |  | 18.4 |
|  | 8.0 |  | 28.0 |
|  | 10.0 |  | 37.4 |
|  | 12.0 |  | 47.2 |
| 5.0 | 5.0 | 50:50 | 63.4 |
| 2.5 | 2.5 |  | 53.8 |
| 1.25 | 1.25 |  | 40.3 |
| 0.909 | 9.091 | 9:91 | 81.8 |
| 0.545 | 5.445 |  | 70.3 |
| 0.227 | 2.273 |  | 19.2 |
| 0.385 | 9.615 | 4:96 | 60.5 |
| 0.231 | 5.769 |  | 35.4 |
| 0.154 | 3.846 |  | 25.1 |
| 0.196 | 9.804 | 2:98 | 49.4 |
| 0.118 | 5.882 |  | 28.9 |

TABLE 4b

Percentage savings of active ingredients and incremental improvements in efficacies, relative to those predicted by the independence model (IM).

| Tr:GTH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 10 | 95 | 95 | 0 | −4 |
|  | 5 | 81 | 86 | −6 | −29 |
|  | 2.5 | 68 | 68 | 0 | 1 |
| 9:91 | 10 | 100 | 74 | 26 | 89 |
|  | 6 | 100 | 53 | 47 | 93 |
|  | 2.5 | 29 | 21 | 8 | 23 |

TABLE 4b-continued

Percentage savings of active ingredients and incremental improvements in efficacies, relative to those predicted by the independence model (IM).

| Tr:GTH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 4:96 | 10 | 91 | 59 | 32 | 62 |
|  | 6 | 54 | 38 | 16 | 32 |
|  | 4 | 38 | 24 | 14 | 34 |
| 2:98 | 10 | 74 | 51 | 23 | 44 |
|  | 6 | 43 | 32 | 11 | 27 |

Example 3

Combinations of 1-hydro-1,2,4-triazole (Tr) and thiocarbamide (TH)

The experimental methodology and computerized data analyses employed here were similar to those employed in the case of Example 1, above.

TABLE 5a

Values of $t_{50}$ for Tr alone, TH alone, and admixtures of the two.

| 1-Hydro-1,2,4-Triazole Concentration [ppm] | Thiocarbamide Concentration [ppm] | Tr:TH Mixing Ratio | $t_{50}$ [days] |
|---|---|---|---|
| 0.1 |  |  | 5.8 |
| 0.25 |  |  | 14.3 |
| 0.5 |  |  | 29.0 |
| 1.0 |  |  | 42.1 |
| 2.0 |  |  | 49.1 |
| 3.0 |  |  | 51.9 |
| 5.0 |  |  | 56.2 |
|  | 2.0 |  | 6.5 |
|  | 4.0 |  | 8.5 |
|  | 8.0 |  | 10.5 |
|  | 10.0 |  | 12.6 |
|  | 16.0 |  | 17.3 |
| 3.0 | 3.0 | 50:50 | 58.2 |
| 2.0 | 2.0 |  | 54.8 |
| 0.909 | 9.091 | 9:91 | 49.9 |
| 0.545 | 5.445 |  | 42.2 |
| 0.227 | 2.273 |  | 27.1 |
| 0.385 | 9.615 | 4:96 | 37.1 |
| 0.154 | 3.846 |  | 24.7 |
| 0.096 | 2.404 |  | 14.9 |
| 0.196 | 9.804 | 2:98 | 26.4 |
| 0.118 | 5.882 |  | 18.0 |

TABLE 5b

Percentage savings of active ingredients and incremental improvements in efficacies, relative to those predicted by the independence model (IM).

| Tr:TH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 6 | 87 | 80 | 7 | 40 |
|  | 4 | 82 | 72 | 10 | 42 |
| 9:91 | 10 | 75 | 63 | 12 | 39 |
|  | 6 | 63 | 49 | 14 | 41 |
|  | 2.5 | 40 | 28 | 12 | 42 |
| 4:96 | 10 | 55 | 48 | 8 | 24 |
|  | 4 | 37 | 26 | 11 | 40 |
|  | 2.5 | 22 | 18 | 5 | 25 |

TABLE 5b-continued

Percentage savings of active ingredients and incremental improvements in efficacies, relative to those predicted by the independence model (IM).

| Tr:TH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 2:98 | 10 | 40 | 38 | 1 | 5 |
|  | 6 | 27 | 27 | 0 | 2 |

Example 4

Combinations of 1-hydro1,2,4-triazole (Tr) and ammonium rhodanide (AR)

The experimental methodology and computerized data analyses employed here were similar to those employed in the case of Example 1, above.

TABLE 6a

Values of $t_{50}$ for Tr alone, AR alone, and admixtures of the two.

| 1-Hydro-1,2,4-Triazole Concentration [ppm] | Ammonium Rhodanide Concentration [ppm] | Tr:AR Mixing Ratio | $t_{50}$ [days] |
|---|---|---|---|
| 0.096 |  |  | 5.5 |
| 0.227 |  |  | 14.0 |
| 0.545 |  |  | 30.0 |
| 0.909 |  |  | 41.5 |
| 1.25 |  |  | 46.0 |
| 2.0 |  |  | 50.0 |
| 3.0 |  |  | 52.3 |
| 5.0 |  |  | 57.0 |
|  | 2.0 |  | 3.1 |
|  | 4.0 |  | 6.3 |
|  | 8.0 |  | 8.5 |
|  | 10.0 |  | 9.3 |
|  | 16.0 |  | 11.9 |
| 3.0 | 3.0 | 50:50 | 56.9 |
| 2.0 | 2.0 |  | 52.5 |
| 1.25 | 1.25 |  | 46.3 |
| 0.545 | 5.445 | 9:91 | 61.6 |
| 0.364 | 3.636 |  | 40.8 |
| 0.227 | 2.273 |  | 35.1 |
| 0.19 | 3.81 | 5:95 | 33.7 |
| 0.119 | 2.38 |  | 25.7 |
| 0.196 | 9.804 | 2:98 | 29.1 |
| 0.118 | 5.882 |  | 22.4 |

TABLE 6b

Percentage savings of active ingredients and incremental improvements in efficacies, relative to those predicted by the independence model (IM).

| Tr:AR Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 6 | 57 | 57 | 0 | −2 |
|  | 4 | 52 | 49 | 3 | 15 |
|  | 2.5 | 46 | 39 | 7 | 29 |
| 9:91 | 6 | 62 | 30 | 32 | 79 |
|  | 4 | 41 | 24 | 17 | 62 |
|  | 2.5 | 35 | 17 | 18 | 68 |
| 5:95 | 4 | 34 | 18 | 16 | 66 |
|  | 2.5 | 26 | 12 | 14 | 66 |
| 2:98 | 10 | 29 | 22 | 7 | 36 |
|  | 6 | 22 | 16 | 6 | 41 |

Example 5

Combinations of 1-hydroxy-methyl-1,2,4-triazole× HCl(HMT) and guanyl thiocarbamide (GTH)

The experimental methodology and computerized data analyses employed here were similar to those employed in the case of Example 1, above.

TABLE 7a

Values of $t_{50}$ for HMT alone, GTH alone, and admixtures of the two.

| 1-Hydroxy-Methyl-1,2,4-Triazole × HCl Concentration [ppm] | Guanyl Thiocarbamide Concentration [ppm] | HMT:GTH Mixing Ratio | $t_{50}$ [days] |
|---|---|---|---|
| 0.25 |  |  | 14.8 |
| 0.5 |  |  | 22.9 |
| 0.75 |  |  | 29.7 |
| 1.0 |  |  | 37.4 |
| 2.0 |  |  | 44.1 |
| 5.0 |  |  | 50.0 |
| 7.5 |  |  | 57.1 |
|  | 1.0 |  | 1.1 |
|  | 2.0 |  | 3.4 |
|  | 4.0 |  | 10.2 |
|  | 8.0 |  | 29.1 |
|  | 10.0 |  | 38.2 |
| 5.0 | 1.0 | 83:17 | 53.1 |
| 2.5 | 0.5 |  | 44.2 |
| 1.25 | 0.25 |  | 38.7 |
| 3.0 | 3.0 | 50:50 | 52.1 |
| 1.5 | 1.5 |  | 43.1 |
| 1.0 | 5.0 | 17:83 | 56.9 |
| 0.5 | 2.5 |  | 29.1 |
| 0.545 | 5.445 | 9:91 | 64.9 |
| 0.273 | 2.727 |  | 28.3 |
| 0.286 | 5.714 | 5:95 | 61.7 |
| 0.143 | 2.857 |  | 23.9 |
| 0.118 | 5.882 | 2:98 | 39.4 |

TABLE 7b

Percentage savings of active ingredients and incremental improvements in efficacies, relative to those predicted by the independence model (IM).

| HMT:GTH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 83:17 | 6 | 80 | 87 | −7 | −50 |
|  | 3 | 66 | 73 | −7 | −32 |
|  | 2.5 | 58 | 54 | 4 | 11 |
| 50:50 | 6 | 78 | 80 | −2 | −10 |
|  | 3 | 65 | 62 | 3 | 8 |
| 17:83 | 6 | 85 | 59 | 26 | 59 |
|  | 3 | 44 | 36 | 8 | 21 |
| 9:91 | 6 | 97 | 47 | 50 | 88 |
|  | 3 | 42 | 26 | 16 | 42 |
| 5:95 | 6 | 92 | 38 | 56 | 85 |
|  | 3 | 36 | 20 | 16 | 47 |
| 2:98 | 6 | 59 | 31 | 28 | 59 |

Example 6

Combinations of 1sodium-1,2,4-triazolate (Na-Tr) and dicyanodiamide (DCD)

The experimental methodology and computerized data analyses employed here were similar to those employed in the case of Example 1, above.

TABLE 8a

Values of $t_{50}$ for Na—Tr alone, DCD alone, and admixtures of the two.

| 1-Sodium-1,2,4-Triazolate Concentration [ppm] | Dicyanodiamide Concentration [ppm] | Na—Tr:DCD Mixing Ratio | $t_{50}$ [days] |
|---|---|---|---|
| 0.25 | | | 9.7 |
| 0.5 | | | 21.4 |
| 0.75 | | | 26.1 |
| 1.0 | | | 31.9 |
| 1.5 | | | 33.7 |
| 2.0 | | | 38.4 |
| 5.0 | | | 41.8 |
| | 1.0 | | 12.4 |
| | 2.0 | | 22.1 |
| | 4.0 | | 26.1 |
| | 6.0 | | 29.6 |
| | 10.0 | | 38.1 |
| 5.0 | 1.0 | 83:17 | 52.1 |
| 2.5 | 0.5 | | 46.7 |
| 3.0 | 3.0 | 50:50 | 60.1 |
| 1.5 | 1.5 | | 51.9 |
| 1.0 | 5.0 | 17:83 | 73.2 |
| 0.5 | 2.5 | | 51.4 |
| 0.545 | 5.445 | 9:91 | 64.2 |
| 0.273 | 2.727 | | 42.9 |
| 0.231 | 5.769 | 4:96 | 47.9 |
| 0.115 | 2.885 | | 35.1 |

TABLE 8b

Percentage savings of active ingredients and incremental improvements in efficacies, relative to those predicted by the independence model (IM).

| Na—Tr: DCD Mixing Ratio | Concentration in Host Soil [ppm] | Empirically Determined Efficacy | Efficacy Predicted by the IM | Efficacy Increment | Dosage Savings [%] |
|---|---|---|---|---|---|
| 83:17 | 6 | 78 | 79 | −1 | −5 |
| | 3 | 70 | 65 | 5 | 20 |
| 50:50 | 6 | 90 | 77 | 13 | 55 |
| | 3 | 78 | 61 | 17 | 51 |
| 17:83 | 6 | 100 | 68 | 32 | — |
| | 3 | 77 | 50 | 27 | 66 |
| 9:91 | 6 | 96 | 63 | 33 | — |
| | 3 | 64 | 45 | 19 | 53 |
| 4:96 | 6 | 72 | 57 | 15 | 47 |
| | 3 | 53 | 40 | 13 | 41 |

Example 7

Combinations of 1-hydro-1,2,4-triazole (Tr) and 3-methylpynizole (MP)

The experimental methodology and computerized data analyses employed here were similar to those employed in the case of Example 1, above.

TABLE 9a

Values of $t_{50}$ for Tr alone, MP alone, and admixtures of the two

| 1-Hydro-1,2,4-Triazole Concentration [ppm] | 3-Methylpyrazole Concentration [ppm] | Tr:MP Mixing Ratio | $t_{50}$ [days] |
|---|---|---|---|
| 0.1 | | | 5.3 |
| 0.25 | | | 14.9 |
| 0.5 | | | 27.8 |
| 0.75 | | | 36.8 |
| 1.0 | | | 41.9 |
| 1.5 | | | 48.7 |
| 3.0 | | | 56.9 |
| | 0.1 | | 9.1 |
| | 0.25 | | 24.5 |
| | 0.5 | | 43.6 |
| | 0.656 | | 46.3 |
| | 1.0 | | 48.7 |
| | 2.0 | | 52.3 |
| 1.0 | 1.0 | 50:50 | 95.6 |
| 0.5 | 0.5 | | 72.7 |
| 1.818 | 1.182 | 91:9 | 69.8 |
| 0.909 | 0.091 | | 51.7 |
| 1.923 | 0.077 | 96:4 | 59.8 |
| 0.962 | 0.038 | | 42.8 |
| 0.077 | 1.923 | 4:96 | 61.0 |
| 0.038 | 0.962 | | 52.4 |

TABLE 9b

Percentage savings of active ingredients and incremental improvements in efficacies, relative to these predicted by the independence model (IM)

| Tr:MP Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 2 | 100 | 90 | 10 | 86 |
| | 1 | 100 | 74 | 26 | 93 |
| 91:9 | 2 | 100 | 83 | 17 | 88 |
| | 1 | 77 | 64 | 13 | 36 |
| 96:4 | 2 | 90 | 81 | 9 | 40 |
| | 1 | 64 | 63 | 1 | 5 |
| 4:96 | 2 | 91 | 88 | 3 | 27 |
| | 1 | 79 | 74 | 5 | 18 |

Example 8

Combinations of $[Cu(Tr)_2]SO_4 \times 2H_2O$ hydrated cuprotriazole-sulfate complex (CTS) and (GMPH)$_2$ZnCl$_4$ 1-guanyl-3-methylpyrazoline-chlorozincate complex (GZC)

The experimental methodology and computerized data analyses employed here were similar to those employed in the case of Example 1, above.

TABLE 10a

Values of $t_{50}$ for CTS alone, GZC alone, and admixtures of the two

| CTS-Concentration [ppm] | GZC-Concentration [ppm] | CTS:GZC Mixing Ratio | $t_{50}$ [days] |
|---|---|---|---|
| 0.1 | | | 1.9 |
| 0.25 | | | 4.9 |
| 0.5 | | | 11.6 |
| 1.2 | | | 27.0 |
| 1.8 | | | 36.1 |
| 2.5 | | | 43.1 |
| | 0.25 | | 9.5 |
| | 0.5 | | 19.1 |
| | 0.75 | | 26.8 |
| | 1.5 | | 43.3 |
| | 3.0 | | 59.1 |
| 1.0 | 1.0 | 50:50 | 77.2 |
| 0.5 | 0.5 | | 53.6 |
| 0.25 | 0.25 | | 21.9 |
| 1.818 | 0.182 | 91:9 | 45.9 |
| 0.909 | 0.091 | | 27.8 |
| 0.182 | 1.818 | 9:91 | 53.6 |
| 0.091 | 0.909 | | 30.0 |

TABLE 10b

Percentage savings of active ingredients and incremental improvements in efficacies, relative to those predicted by the independence model (IM)

| CTS:GZC Mixing Ratio | Concentration in Host Soil [ppm] | Empirically Determined Efficacy | Efficacy Predicted by the IM | Efficacy Increment | Dosage Savings [%] |
|---|---|---|---|---|---|
| 50:50 | 2 | 100 | 72 | 28 | 84 |
| | 1 | 80 | 42 | 38 | 61 |
| | 0.5 | 33 | 19 | 14 | 37 |
| 91:9 | 2 | 69 | 64 | 5 | 14 |
| | 1 | 42 | 36 | 6 | 13 |
| 9:91 | 2 | 80 | 74 | 5 | 16 |
| | 1 | 45 | 51 | −5 | −15 |

Example 9

Combinations of 1-hydro-1,2,4-triazole (Tr), dicyanodiamide (DCD), and ammonium rhodanide (AR)

The experimental methodology and computerized data analyses employed here were similar to those employed in the case of Example 1, above.

TABLE 11a

Values of $t_{50}$ for Tr alone, DCD alone, AR alone, and admixtures of all three

| Tr-Concentration [ppm] | DCD-Concentration [ppm] | AR-Concentration [ppm] | Tr:DCD:AR Mixing Ratio | $t_{50}$ [days] |
|---|---|---|---|---|
| 0.096 | | | | 5.5 |
| 0.227 | | | | 13.8 |
| 0.545 | | | | 30.2 |
| 0.909 | | | | 41.5 |
| 1.25 | | | | 46.0 |
| 2.0 | | | | 50.1 |
| 3.0 | | | | 52.3 |
| 5.0 | | | | 57.0 |
| | 1.25 | | | 10.1 |
| | 2.0 | | | 14.3 |

TABLE 11a-continued

Values of $t_{50}$ for Tr alone, DCD alone, AR alone, and admixtures of all three

| Tr-Concentration [ppm] | DCD-Concentration [ppm] | AR-Concentration [ppm] | Tr:DCD:AR Mixing Ratio | $t_{50}$ [days] |
|---|---|---|---|---|
|  | 3.0 |  |  | 17.6 |
|  | 3.846 |  |  | 19.7 |
|  | 5.0 |  |  | 22.1 |
|  | 5.882 |  |  | 23.6 |
|  | 8.333 |  |  | 27.4 |
|  | 10.0 |  |  | 29.6 |
|  |  | 2.0 |  | 2.8 |
|  |  | 4.0 |  | 6.3 |
|  |  | 8.0 |  | 8.5 |
|  |  | 10.0 |  | 9.3 |
|  |  | 16.0 |  | 11.9 |
| 0.833 | 4.167 | 0.833 | 14.3:71.4:14.3 | 67.1 |
| 0.5 | 2.5 | 0.5 |  | 52.4 |
| 0.385 | 3.846 | 0.769 | 7.7:76.9:15.4 | 58.9 |
| 0.231 | 2.308 | 0.462 |  | 37.7 |
| 0.192 | 3.846 | 0.962 | 3.8:77:19.2 | 45.7 |
| 0.115 | 2.308 | 0.575 |  | 34.7 |

TABLE 11b

Percentage savings of active ingredients and incremental improvements in efficacies, relative to those predicted by the independence model (IM)

| Tr:DCD:AR Mixing Ratio | Concentration in Host Soil [ppm] | Empirically Determined Efficacy | Efficacy Predicted by the IM | Efficacy Increment | Dosage Savings [%] |
|---|---|---|---|---|---|
| 14.3:71.4:14.3 | 5.83 | 100 | 67 | 33 | — |
|  | 3.5 | 79 | 53 | 26 | 61 |
| 7.7:76.9:15.4 | 5.0 | 89 | 53 | 36 | 75 |
|  | 3.0 | 57 | 39 | 18 | 46 |
| 3.8:77:19.2 | 5.0 | 69 | 44 | 25 | 56 |
|  | 3.0 | 52 | 31 | 21 | 54 |

Example 10

Combinations of 1-hydro-1,2,4-triazole hydrochloride (Tr×HCl), guanyl thiocarbamide (GTH), and thiocarbamide (TH)

The experimental methodology and computerized data analyses employed here were similar to those employed in the case of Example 1, above.

TABLE 12a

Values of $t_{50}$ for Tr × HCl alone, GTH alone, TH alone, and admixtures of all three

| Tr × HCl-Concentration [ppm] | GTH-Concentration [ppm] | TH-Concentration [ppm] | Tr × HCl:GTH:TH Mixing Ratio | $t_{50}$ [days] |
|---|---|---|---|---|
| 0.15 |  |  |  | 5.0 |
| 0.3 |  |  |  | 11.5 |
| 0.75 |  |  |  | 28.4 |
| 1.5 |  |  |  | 41.3 |
| 3.0 |  |  |  | 48.9 |
| 4.5 |  |  |  | 52.1 |
|  | 2.0 |  |  | 1.9 |
|  | 4.0 |  |  | 9.5 |
|  | 8.0 |  |  | 28.1 |
|  | 10.0 |  |  | 37.0 |
|  | 16.0 |  |  | 60.1 |
|  |  | 2.0 |  | 6.3 |
|  |  | 4.0 |  | 8.7 |
|  |  | 8.0 |  | 10.9 |
|  |  | 10.0 |  | 13.0 |
|  |  | 16.0 |  | 18.1 |

TABLE 12a-continued

Values of $t_{50}$ for Tr × HCl alone, GTH alone, TH alone, and admixtures of all three

| Tr × HCl-Concentration [ppm] | GTH-Concentration [ppm] | TH-Concentration [ppm] | Tr × HCl:GTH:TH Mixing Ratio | $t_{50}$ [days] |
|---|---|---|---|---|
| 0.115 | 2.308 | 0.577 | 3.8:77:19.2 | 17.9 |
| 0.231 | 4.615 | 1.155 | | 44.8 |
| 0.115 | 1.422 | 1.422 | 3.8:48.1:48.1 | 11.9 |
| 0.231 | 2.885 | 2.885 | | 37.9 |
| 0.231 | 1.155 | 4.615 | 3.8:19.2:77 | 27.8 |
| 0.5 | 2.0 | 0.5 | 17:66:17 | 53.1 |
| 0.5 | 1.25 | 1.25 | 16.6:41.7:41.7 | 39.9 |
| 0.188 | 1.875 | 0.937 | 6.3:62.5:31.2 | 21.3 |
| 0.375 | 3.75 | 1.875 | | 47.1 |

TABLE 12b

Percentage savings of active ingredients and incremental improvements in efficacies, relative to those predicted by the independence model (IM)

| Tr × HCl:GTH:TH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 3.8:77:19.2 | 3.0 | 27 | 16 | 11 | 36 |
| | 6.0 | 67 | 35 | 32 | 57 |
| 3.8:48.1:48.1 | 3.0 | 19 | 12 | 7 | 28 |
| | 6.0 | 57 | 30 | 27 | 51 |
| 3.8:19.2:77 | 6.0 | 42 | 25 | 17 | 40 |
| 17:66:17 | 3.0 | 81 | 33 | 48 | 74 |
| 16.6:41.7:41.7 | 3.0 | 60 | 30 | 30 | 55 |
| 6.3:62.5:31.2 | 3.0 | 33 | 17 | 16 | 43 |
| | 6.0 | 71 | 38 | 33 | 56 |

Example 11

Combinations of 1-guanyl-1,2,4triazole hydrochloride (GTr), dicyanodiamide (DCD), and thiocarbamide (TH)

The experimental methodology and computerized data analyses employed here were similar to those employed in the case of Example 1, above.

TABLE 13a

Values of $t_{50}$ for GTr alone, DCD alone, TH alone, and admixtures of all three

| GTr-Concentration [ppm] | DCD-Concentration [ppm] | TH-Concentration [ppm] | GTr:DCD:TH Mixing Ratio | $t_{50}$ [days] |
|---|---|---|---|---|
| 1.4 | | | | 27.5 |
| 2.14 | | | | 37.5 |
| 4.3 | | | | 47.3 |
| 8.5 | | | | 49.2 |
| 10.0 | | | | 55.2 |
| | 1.0 | | | 8.9 |
| | 2.0 | | | 14.2 |
| | 3.0 | | | 17.1 |
| | 5.0 | | | 22.3 |
| | 8.0 | | | 26.8 |
| | 10.0 | | | 30.1 |
| | | 2.0 | | 6.3 |
| | | 4.0 | | 8.7 |
| | | 8.0 | | 10.9 |
| | | 10.0 | | 13.0 |
| | | 16.0 | | 18.1 |
| 0.192 | 3.840 | 0.968 | 3.8:76.8:19.4 | 43.8 |
| 0.308 | 6.160 | 1.54 | | 61.7 |
| 0.192 | 2.404 | 2.404 | 3.8:48.1:48.1 | 37.4 |
| 0.308 | 3.846 | 3.846 | | 57.8 |
| 0.192 | 0.968 | 3.840 | 3.8:19.4:76.8 | 27.9 |
| 0.308 | 1.540 | 6.160 | | 32.7 |

TABLE 13b

Percentage savings of active ingredients and incremental improvements in efficacies, relative to those predicted by the independence model (IM)

| GTr:DCD:TH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 3.8:76.8:19.4 | 5.0 | 66 | 48 | 18 | 60 |
|  | 8.0 | 93 | 32 | 61 | 98 |
| 3.8:48.1:48.1 | 5.0 | 56 | 46 | 10 | 40 |
|  | 8.0 | 87 | 55 | 31 | 84 |
| 3.8:19.4:76.8 | 5.0 | 42 | 42 | 0 | −1 |
|  | 8.0 | 49 | 51 | −2 | −10 |

Example 12

Combinations of 1-hydro-1,2,4-triazole (Tr), dicyanodiamide (DCD), and ammonium thiosulfate (ATS)

The experimental methodology and computerized data analyses employed here were similar to those employed in the case of Example 1, above.

TABLE 14a

Values of $t_{50}$ for Tr alone, DCD alone, ATS alone, and admixtures of all three

| Tr-Concentration [ppm] | DCD-Concentration [ppm] | ATS-Concentration [ppm] | Tr:DCD:ATS Mixing Ratio | $t_{50}$ [days] |
|---|---|---|---|---|
| 0.096 | | | | 5.5 |
| 0.227 | | | | 14.0 |
| 0.545 | | | | 30.0 |
| 0.909 | | | | 41.5 |
| 1.25 | | | | 46.0 |
| 2.0 | | | | 50.0 |
| 3.0 | | | | 52.3 |
| 5.0 | | | | 57.0 |
| | 1.25 | | | 10.0 |
| | 2.0 | | | 14.3 |
| | 3.0 | | | 17.6 |
| | 3.846 | | | 19.7 |
| | 5.0 | | | 22.0 |
| | 5.882 | | | 23.6 |
| | 8.333 | | | 27.3 |
| | 9.091 | | | 28.4 |
| | 10.0 | | | 29.6 |
| | | 2.0 | | 0 |
| | | 4.0 | | 0 |
| | | 8.0 | | 0 |
| | | 10.0 | | 0 |
| | | 16.0 | | 0 |
| 0.115 | 2.308 | 0.577 | 4:77:19 | 35.7 |
| 0.115 | 1.422 | 1.422 | 4:48:48 | 27.8 |
| 0.115 | 0.577 | 2.308 | 4:19:77 | 14.1 |

TABLE 14b

Percentage savings of active ingredients and incremental improvements in efficacies, relative to those predicted by the independence model (IM)

| Tr:DCD:ATS Mixing Ratio | Concentration in Host Soil [ppm] | Empirically Determined Efficacy | Efficacy Predicted by the IM | Efficacy Increment | Dosage Savings [%] |
|---|---|---|---|---|---|
| 4:77:19 | 3.0 | 53 | 35 | 18 | 55 |
| 4:48:48 | 3.0 | 42 | 30 | 12 | 42 |
| 4:19:77 | 3.0 | 21 | 24 | −3 | −20 |

Example 13

Combinations of $[Fe(Tr)_6]Cl_3$ ferrochlorotriazole complex (Fe—Tr), dicyanodiamide (DCD), and ammonium thiosulfate (ATS)

The experimental methodology and computerized data analyses employed here were similar to those employed in the case of Example 1, above.

TABLE 15a

Values of $t_{50}$ for Fe-Tr alone, DCD alone, ATS alone, and admixtures of all three

| Fe-Tr-Concentration [ppm] | DCD-Concentration [ppm] | ATS-Concentration [ppm] | Fe-Tr:DCD:ATS Mixing Ratio | $t_{50}$ [days] |
|---|---|---|---|---|
| 0.072 | | | | 3.9 |
| 0.163 | | | | 10.3 |
| 0.39 | | | | 21.2 |
| 0.65 | | | | 29.4 |
| 0.9 | | | | 33.3 |
| 1.44 | | | | 35.7 |
| 2.15 | | | | 39.4 |
| 4.0 | | | | 42.9 |
| 6.0 | | | | 49.9 |
| | 0.5 | | | 4.8 |
| | 1.0 | | | 9.3 |
| | 2.5 | | | 15.4 |
| | 5.0 | | | 22.6 |
| | 7.5 | | | 27.3 |
| | 10.0 | | | 32.8 |
| | | 2.0 | | 0.09 |
| | | 4.0 | | 0.09 |
| | | 6.0 | | 0.1 |
| | | 8.0 | | 0.1 |
| | | 10.0 | | 0.1 |
| 2.0 | 2.0 | 2.0 | 33.3:33.3:33.3 | 54.6 |
| 1.0 | 1.0 | 1.0 | | 45.8 |
| 0.231 | 4.615 | 1.154 | 3.8:77:19.2 | 51.2 |
| 0.115 | 2.308 | 0.577 | | 35.8 |
| 0.231 | 2.885 | 2.885 | 3.8:48.1:48.1 | 44.9 |
| 0.115 | 1.422 | 1.422 | | 28.8 |
| 0.231 | 1.154 | 4.615 | 3.8:19.2:77 | 29.5 |
| 0.115 | 0.577 | 2.308 | | 16.7 |
| 0.545 | 4.364 | 1.091 | 9.1:72.7:18.2 | 57.9 |
| 0.273 | 2.182 | 0.545 | | 39.7 |

TABLE 15b

Percentage savings of active ingredients and incremental improvements in efficacies, relative to those predicted by the independence model (IM)

| Fe-Tr:DCD:ATS Mixing Ratio | Concentration in Host Soil [ppm] | Empirically Determined Efficacy | Efficacy Predicted by the IM | Efficacy Increment | Dosage Savings [%] |
|---|---|---|---|---|---|
| 33.3:33.3:33.3 | 6.0 | 82 | 66 | 16 | 58 |
| | 3.0 | 68 | 52 | 16 | 55 |
| 3.8:77:19.2 | 6.0 | 77 | 46 | 29 | 76 |
| | 3.0 | 53 | 32 | 21 | 63 |
| 3.8:48.1:48.1 | 6.0 | 67 | 40 | 27 | 69 |
| | 3.0 | 43 | 27 | 16 | 56 |
| 3.8:19.2:77 | 6.0 | 44 | 32 | 12 | 44 |
| | 3.0 | 25 | 21 | 4 | 26 |
| 9.1:72.7:18.2 | 6.0 | 87 | 55 | 32 | 81 |
| | 3.0 | 60 | 39 | 21 | 60 |

Example 14

Combinations of [Mn(Tr)$_4$]Cl$_2$ manganochlorotriazole complex (MT), Mg(GMP)$_2$Cl$_2$×H$_2$O hydrated 1-guanyl-3-methyl pyrazole magnesium-chloride complex (GM), and dicyanodiamide (DCD)

The experimental methodology and computerized data analyses employed here were similar to those employed in the case of Example 1, above.

TABLE 16a

Values of $t_{50}$ for MT alone, GM alone, DCD alone, and admixtures of all three

| MT-Concentration [ppm] | GM-Concentration [ppm] | DCD-Concentration [ppm] | MT:GM:DCD Mixing Ratio | $t_{50}$ [days] |
|---|---|---|---|---|
| 0.2 | | | | 5.6 |
| 0.5 | | | | 15.5 |
| 1.0 | | | | 28.4 |
| 1.5 | | | | 35.4 |
| 2.0 | | | | 42.1 |
| 3.0 | | | | 49.7 |
| | 0.2 | | | 8.5 |
| | 0.6 | | | 25.6 |
| | 1.0 | | | 42.9 |
| | 1.5 | | | 46.8 |
| | 2.0 | | | 48.4 |
| | | 2.0 | | 20.7 |
| | | 4.0 | | 25.9 |
| | | 8.0 | | 31.5 |
| | | 10.0 | | 35.4 |
| | | 16.0 | | 52.5 |
| 1.667 | 1.667 | 1.667 | 33.3:33.3:33.3 | 106.9 |
| 1.0 | 1.0 | 1.0 | | 85.7 |
| 0.667 | 0.667 | 0.667 | | 61.8 |
| 0.417 | 0.417 | 4.166 | 8.3:8.3:83.4 | 64.1 |
| 0.25 | 0.25 | 2.5 | | 44.8 |
| 0.167 | 0.167 | 1.666 | | 34.1 |
| 0.185 | 0.185 | 4.630 | 3.7:3.7:92.6 | 60.7 |
| 0.111 | 0.111 | 2.778 | | 40.1 |
| 0.543 | 0.109 | 4.348 | 10.9:2.1:87 | 54.6 |
| 0.109 | 0.543 | 4.348 | 2.1:10.9:87 | 61.4 |

TABLE 16b

Percentage savings of active ingredients and incremental improvements in efficacies, relative to those predicted by the independence model (IM)

| MT:GM:DCD Mixing Ratio | Concentration in Host Soil [ppm] | Empirically Determined Efficacy | Efficacy Predicted by the IM | Efficacy Increment | Dosage Savings [%] |
|---|---|---|---|---|---|
| 33.3:33.3:33.3 | 5.0 | 100 | 89 | 11 | 84 |
| | 3.0 | 100 | 76 | 24 | 91 |
| | 2.0 | 93 | 62 | 31 | 68 |
| 8.3:8.3:83.4 | 5.0 | 96 | 64 | 32 | 73 |
| | 3.0 | 67 | 45 | 22 | 44 |
| | 2.0 | 51 | 31 | 20 | 44 |
| 3.7:3.7:92.6 | 5.0 | 91 | 54 | 37 | 73 |
| | 3.0 | 60 | 37 | 23 | 50 |
| 10.9:2.1:87 | 5.0 | 82 | 59 | 23 | 52 |
| 2.1:10.9:87 | 5.0 | 92 | 63 | 29 | 67 |

Example 15

Combinations of 1-hydro-1,2,4-triazole (Tr) 3-methylpyrazole (MP), and guanyl thiocarbamide (GTH)

The experimental methodology and computerized data analyses employed here were similar to those employed in the case of Example 1, above.

TABLE 17a

Values of $t_{50}$ for Tr alone, MP alone, GTH alone, and admixtures of all three

| Tr-Concentration [ppm] | MP-Concentration [ppm] | GTH-Concentration [ppm] | Tr:MP:GTH Mixing Ratio | $t_{50}$ [days] |
|---|---|---|---|---|
| 0.1 | | | | 5.8 |
| 0.25 | | | | 14.3 |
| 0.5 | | | | 29.0 |
| 0.75 | | | | 42.1 |
| 1.0 | | | | 49.1 |
| 1.5 | | | | 51.9 |
| 3.0 | | | | 56.2 |
| | 0.1 | | | 9.1 |
| | 0.25 | | | 24.5 |
| | 0.5 | | | 43.6 |
| | 0.656 | | | 46.3 |
| | 1.0 | | | 48.7 |
| | 2.0 | | | 52.3 |
| | | 2.0 | | 1.0 |
| | | 4.0 | | 9.3 |
| | | 6.0 | | 18.4 |
| | | 8.0 | | 28.0 |
| | | 10.0 | | 37.4 |
| | | 12.0 | | 47.2 |
| 1.667 | 1.667 | 1.667 | 33.3:33.3:33.3 | 112.1 |
| 1.0 | 1.0 | 1.0 | | 105.7 |
| 0.227 | 0.227 | 4.546 | 4.5:4.5:91 | 73.4 |
| 0.136 | 0.136 | 2.727 | | 47.8 |
| 0.119 | 0.119 | 4.762 | 2.4:2.4:95.2 | 44.9 |
| 0.071 | 0.071 | 2.857 | | 29.3 |

TABLE 17b

Percentage savings of active ingredients and incremental improvements in efficacies, relative to those predicted by the independence model (IM).

| Tr:MP:GTH Mixing Ratio | Concentration in Host Soil [ppm] | Empirically Determined Efficacy | Efficacy Predicted by the IM | Efficacy Increment | Dosage Savings [%] |
|---|---|---|---|---|---|
| 33.3:33.3:33.3 | 5.0 | 100 | 98 | 2 | 65 |
| 33.3:33.3:33.3 | 3.0 | 100 | 92 | 8 | 69 |
| 4.5:4.5:91 | 5.0 | 100 | 56 | 44 | 91 |
| 4.5:4.5:91 | 3.0 | 72 | 35 | 37 | 59 |
| 2.4:2.4:95.2 | 5.0 | 67 | 40 | 27 | 48 |
| 2.4:2.4:95.2 | 3.0 | 44 | 23 | 21 | 46 |

Example 16

Combinations of 1-hydro-1,2,4-triazole (Tr), 3-methylpyrazole (MP), and dicyanodiamide (DCD)

The experimental methodology and computerized data analyses employed here were similar to those employed in the case of Example 1, above.

TABLE 18a

Values of $t_{50}$ for Tr alone, MP alone, DCD alone, and admixtures of all three.

| Tr-Concentration [ppm] | MP-Concentration [ppm] | DCD-Concentration [ppm] | Tr:MP:DCD Mixing Ratio | $t_{50}$ [days] |
|---|---|---|---|---|
| 0.1 | | | | 5.2 |
| 0.25 | | | | 13.4 |
| 0.5 | | | | 28.1 |
| 0.75 | | | | 40.7 |
| 1.0 | | | | 46.9 |
| 1.5 | | | | 49.8 |
| 3.0 | | | | 52.1 |
| | 0.1 | | | 7.6 |
| | 0.25 | | | 19.4 |
| | 0.5 | | | 35.7 |
| | 0.656 | | | 40.1 |
| | 1.0 | | | 46.1 |
| | 2.0 | | | 49.7 |
| | | 0.5 | | 4.1 |
| | | 1.0 | | 9.1 |
| | | 2.5 | | 14.2 |
| | | 5.0 | | 22.3 |
| | | 10.0 | | 30.7 |
| | | 13.0 | | 41.8 |
| 1.667 | 1.667 | 1.667 | 33.3:33.3:33.3 | 112.9 |
| 1.0 | 1.0 | 1.0 | 33.3 | 102.3 |
| 0.227 | 0.227 | 4.546 | 4.5:4.5:91 | 79.4 |
| 0.136 | 0.136 | 2.727 | | 52.9 |
| 0.119 | 0.119 | 4.762 | 2.4:2.4:95.2 | 57.1 |
| 0.071 | 0.071 | 2.857 | | 41.8 |

TABLE 18b

Percentage savings of active ingredients and incremental improvements in efficacies, relative to those predicted by the independence model (IM).

| Tr:MP:DCD Mixing Ratio | Concentration in Host Soil [ppm] | Empirically Determined Efficacy | Efficacy Predicted by the IM | Efficacy Increment | Dosage Savings [%] |
|---|---|---|---|---|---|
| 33.3:33.3:33.3 | 5.0 | 100 | 95 | 5 | 82 |
| 33.3:33.3:33.3 | 3.0 | 100 | 88 | 12 | 89 |
| 4.5:4.5:91 | 5.0 | 100 | 64 | 36 | 94 |
| 4.5:4.5:91 | 3.0 | 79 | 47 | 32 | 63 |
| 2.4:2.4:95.2 | 5.0 | 86 | 54 | 32 | 66 |
| 2.4:2.4:95.2 | 3.0 | 63 | 38 | 25 | 54 |

We claim:

1. A method for inhibiting and controlling the nitrification of ammonium nitrogen in arable soils and substrates, comprising the step of applying to the soil an amount effective therefor of a composition comprising:

1 to 35% by weight of a first compound selected from the group consisting of 1H-1,2,4-triazole, substituted 1H-1,2,4-triazole and their salts, and metallic complexes thereof;

1 to 80% by weight of dicyanodiamide, 10 to 98% by weight of a third compound selected from the group consisting of guanyl thiocarbamide, thiocarbamide, ammonium rhodanide and ammonium thiosulfate, applied in an amount from 0.2 to 4 percent by weight with respect to a nitrogen content of a fertilizer containing at least one component selected from the group consisting of ammonium and amide.

2. The method of claim 1 wherein the composition is administered at a dosage of at least 0.5 kg per hectare.

3. In combination, 1 to 35% by weight of a first compound selected from the group consisting of 1H-1,2,4-triazole, substituted 1H-1,2,4-triazole and their salts, and metallic complexes thereof;

1 to 80% by weight of dicyanodiamide, and 10 to 98% by weight of a third compound which is selected from the group consisting of guanyl thiocarbamide, thiocarbamide, ammonium rhodanide and ammonium thiosulfate, applied in an amount from 0.2 to 4 percent by weight with respect to a nitrogen content of a fertilizer containing at least one component selected from the group consisting of ammonium and amide, for use in inhibiting and controlling the nitrification of ammonium nitrogen in arable soils and substrates.

* * * * *

UNITED STATES PATENT AND TRADEMARK OFFICE
CERTIFICATE OF CORRECTION

PATENT NO. : 5,951,736  
DATED : September 14, 1999  
INVENTOR(S) : Margrit Grabarse et al.

Page 1 of 1

It is certified that error appears in the above-identified patent and that said Letters Patent is hereby corrected as shown below:

<u>Title page,</u>
<u>Column 1,</u>
Item [54], line 1, change "COMBINATIONS" to -- COMBINATION --

Signed and Sealed this

Second Day of October, 2001

Attest:

*Attesting Officer*

NICHOLAS P. GODICI  
*Acting Director of the United States Patent and Trademark Office*